H. O'LEARY.
VALVE.
APPLICATION FILED APR. 6, 1911.
1,013,432.
Patented Jan. 2, 1912.
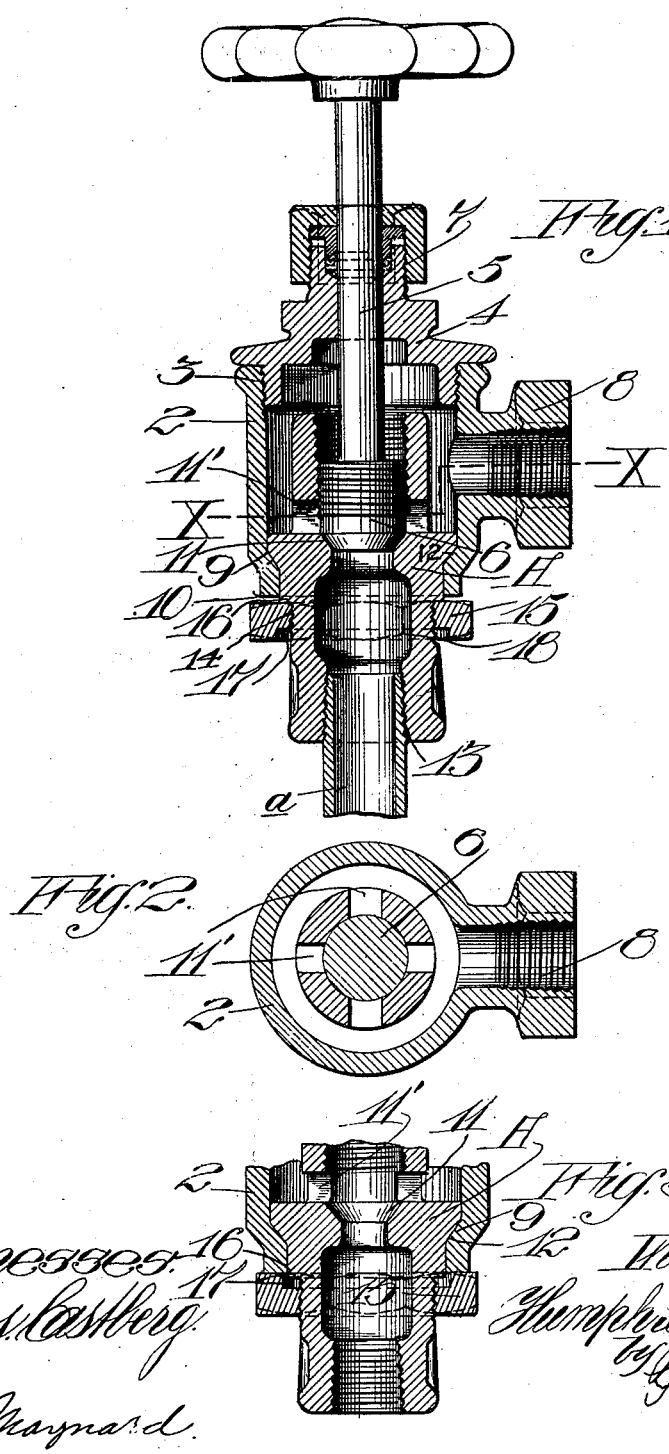

UNITED STATES PATENT OFFICE.

HUMPHREY O'LEARY, OF SAN FRANCISCO, CALIFORNIA.

VALVE.

1,013,432.  Specification of Letters Patent.  Patented Jan. 2, 1912.

Application filed April 6, 1911. Serial No. 619,266.

*To all whom it may concern:*

Be it known that I, HUMPHREY O'LEARY, citizen of the United States, residing in the city and county of San Francisco and State of California, have invented new and useful Improvements in Valves, of which the following is a specification.

This invention relates to valves, and particularly to angle valves.

The object of the present invention is to provide a simple, substantial valve so designed as to permit one of its elements to swing or swivel freely about an axis; and also to provide a valve which may be converted from a swivel valve into a stationary valve; and to provide means whereby the valve may be hermetically locked to prevent leakage.

The invention consists of the parts and the construction and combination of parts as hereinafter more fully described and claimed, having reference to the accompanying drawings, in which—

Figure 1 is a vertical section through the valve. Fig. 2 is a transverse section on line X—X Fig. 1. Fig. 3 is a detail, showing the valve in non-swiveling locked position.

It is a desideratum to provide an angle valve so designed and constructed that one of the elements to which a coupling or connection, such as a flexible hose, may be attached, can swing freely in a circle and thereby prevent kinking of the hose when the latter is moved about, for instance, over a lawn or in a building. The valve is equally adaptable to control the passage of fluid or liquid and may be made tight so as to prevent the turnable member from rotating when it is desired to so mount it.

In the present embodiment of my invention A is a valve body adapted to be fixedly secured to a stand pipe *a*.

2 represents a swivel union embracing and turnable on the body A. The union 2 may be cylindrical or globular in shape, and is provided with a threaded portion 3 to which may be attached a bonnet 4 in which is guided a valve stem 5, having a handle at its upper end and a valve disk 6 at its lower end. A suitable packing gland 7 is provided and attached to the upper portion of the bonnet 4 to prevent leakage of fluid or liquid past the valve stem. The swivel union 2 is provided with a projection 8, whereon may be attached a hose or pipe through which fluid or liquid admitted into the body A may pass. The lower portion of the union 2 is provided with a rearwardly projecting, conical shoulder or seat 9 which is adapted to coöperate with a corresponding rearwardly projecting, conical seat 12 on the valve body A. Within the body A is a valve seat 11 for the valve 6. The body A is provided at its upper end with an upwardly extended portion of reduced diameter, which is provided with transverse ports 11′ through which the fluid admitted past the valve 6 may enter the union 2. A portion of the exterior of the body A below the conical seat 12 is threaded to receive a reversible nut 15 adapted, when the device is to be used as a swivel valve as in Fig. 1, to be screwed up against a shoulder 16 formed upon the exterior of the body A.

The valve as thus described is capable of being mounted so that the union 2 may be swiveled about its axis. By reversing the nut 15, as shown in Fig. 3, the union 2 may be rendered stationary and hermetically sealed against the conical seat 12, since the recess 17 on the nut clears the shoulder 16 and allows the nut to jam the swivel snug up against the seat 12.

In adapting the valve for swiveling operation the nut 15, when advanced upwardly over the screw threads 14, is carried against the shoulder 16 which is sufficiently spaced below the conical shoulder 9 as to allow the union to swivel or turn about the body A circumferentially so that when a flexible device, such as a hose, has been attached to the projection 8 the coupling or union 2 may be moved in a complete circle about the valve without kinking the flexible connected portion whatsoever. When the valve is to be adapted in a stationary position, as for instance when it is erected in a system of immovable pipes in a steam plant or water system, it is then desirable that the union 2 be rendered absolutely stationary and hermetically sealed. In this case the nut 15 is placed upon the lower portion of the valve body A with the counter-bore or sunken portion 17 facing the shoulder 16. The diameter of the counter-bore 17 is slightly larger than the diameter of the shoulder 16. Thus when the nut 15 is advanced over the screw threads 14 the surface 18 of the nut bears upon the transverse end 10 of the union 2 and thus draws the conical faces 9 and 12, formed respectively on the union 2 and the valve body A, into a close juxtaposition forming a water tight joint.

One of the particular advantages in providing an angle valve of this construction is that in erecting a pipe system the union 2 can be attached at its projection 8 to a pipe or other structure which has been permanently secured in place, and these two members can be screwed together until a perfectly tight joint is formed between them. Then a connection can be made to the lower threaded portion of the valve body A and can be rendered absolutely tight by turning the body A. This cannot be accomplished with ordinary reciprocating valves because of the fact that when two pipes or conductors meet at an angle, one or the other of the meeting conductors to which the valve is to be connected is either generally left slightly loose and must be leaded, or it is too tightly screwed into the valve threads, thus stripping the threads and producing a leaky joint. By this valve the conductors can be coupled to the union 2 and to the lower portion of the valve body A respectively and screwed to a good, tight joint. While the coupling is being made to the valve body A the latter may be allowed to turn freely within the union 2. After the joint has been completed between the conductors to be attached to the valve and a good joint made, then the locking nut 15 is advanced over the valve body A to permanently seat the conical shoulders 9 and 12 and form a hermetically tight joint. When the valve is erected for a swiveling action leakage is prevented between the working joint made at 9 and 12 by reason of the fact that the passage of the fluid or liquid admitted into the union 2 is effective, by the pressure of the same against the bonnet, to firmly seat the conical surfaces 9 and 12, thus making a tight joint but not preventing the swiveling of the union 2 on the valve body.

Having thus described my invention, what I claim and desire to secure by Letters Patent, is—

1. A swivel valve, comprising a fixed body portion having a lower induction port and an upper eduction port, and provided on its exterior surface with an upwardly extending conical seat, a swivel union with a conical seat surrounding and bearing upwardly against the body seat, a bonnet and valve carried by the swivel union, and a nut on the body and engageable upwardly against the swivel union.

2. A valve comprising a union having an internal conical shoulder, a separable chambered valve body having an external conical shoulder to seat downwardly upon the aforesaid shoulder in the union, a nut adjustable upon the valve body below the union, a closure for the union, and a valve disk and stem adapted to seat upon said body and guided in said closure.

3. A valve comprising a chambered valve body adapted to be secured to a fluid conductor having an external shoulder, a union swivelly mounted upon said body, a closure for said union, and means for sustaining the turnable union upon the valve body, said means comprising a reversible nut adapted to seat against the said shoulder and allow motion of the union relatively to the seat.

4. A valve comprising a chambered valve body adapted to be fixedly mounted, a union and its bonnet turnable about the fixed body, a valve disk and stem movable within the union, and means whereby the union may be immovably seated against the valve body, said means including a reversible nut having a counter-sunk face adapted to be screwed over the exterior of the fixed valve body and engage the end of the union to seat the union firmly upon the valve body.

In testimony whereof I have hereunto set my hand in the presence of two subscribing witnesses.

HUMPHREY O'LEARY.

Witnesses:
M. E. O'HARRA,
J. H. HARTUPEE.

---

Copies of this patent may be obtained for five cents each, by addressing the "Commissioner of Patents, Washington, D. C."